Feb. 26, 1929.  
C. T. McGILL  
1,703,451  
BASE EXCHANGE WATER SOFTENER AND FILTER  
Filed April 3, 1926   2 Sheets-Sheet 1
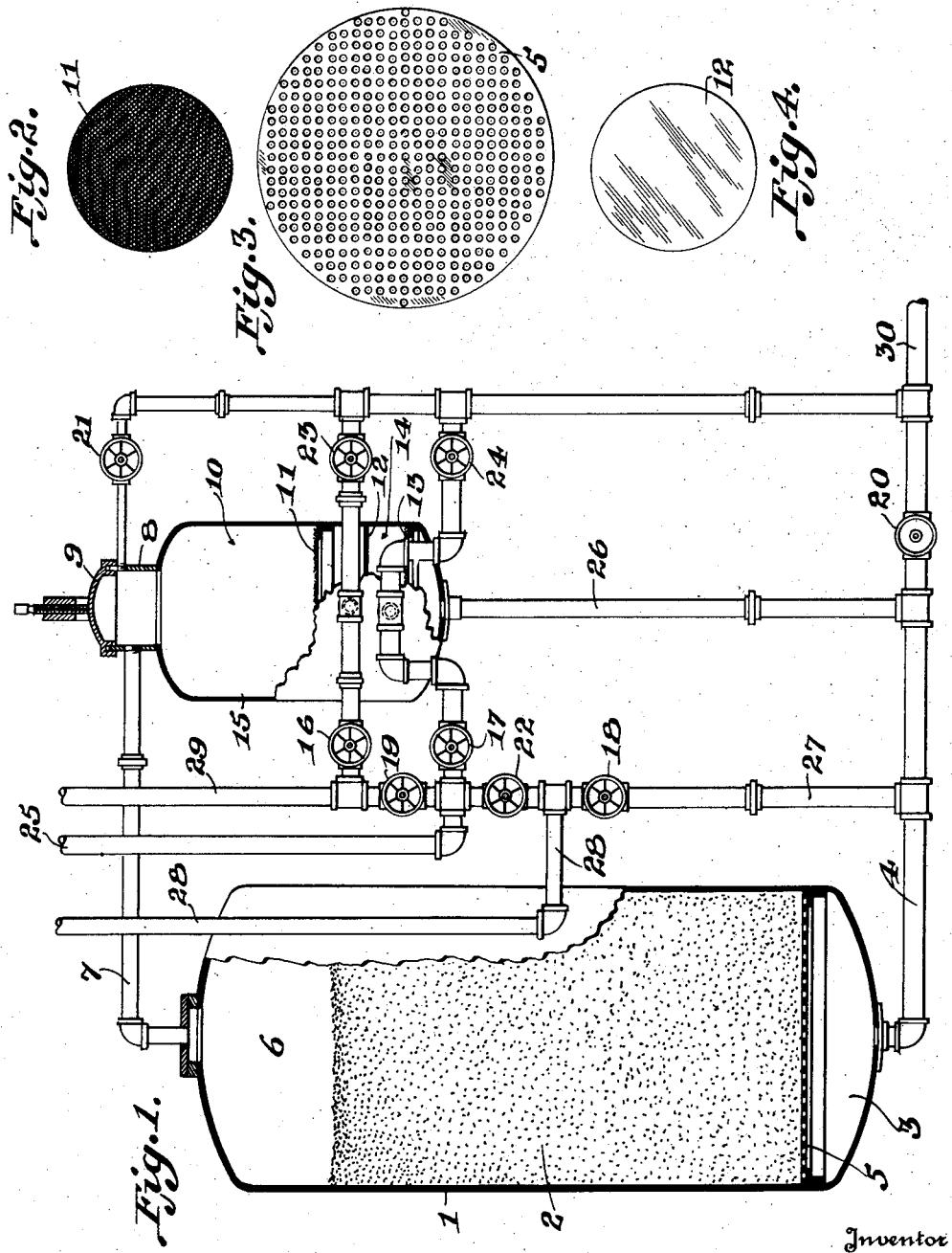
Inventor  
Chester T. McGill  
By Mason Fenwick & Lawrence  
Attorneys

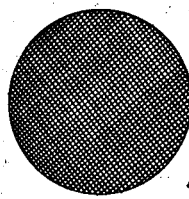
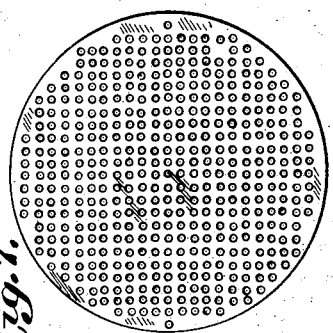
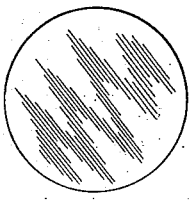
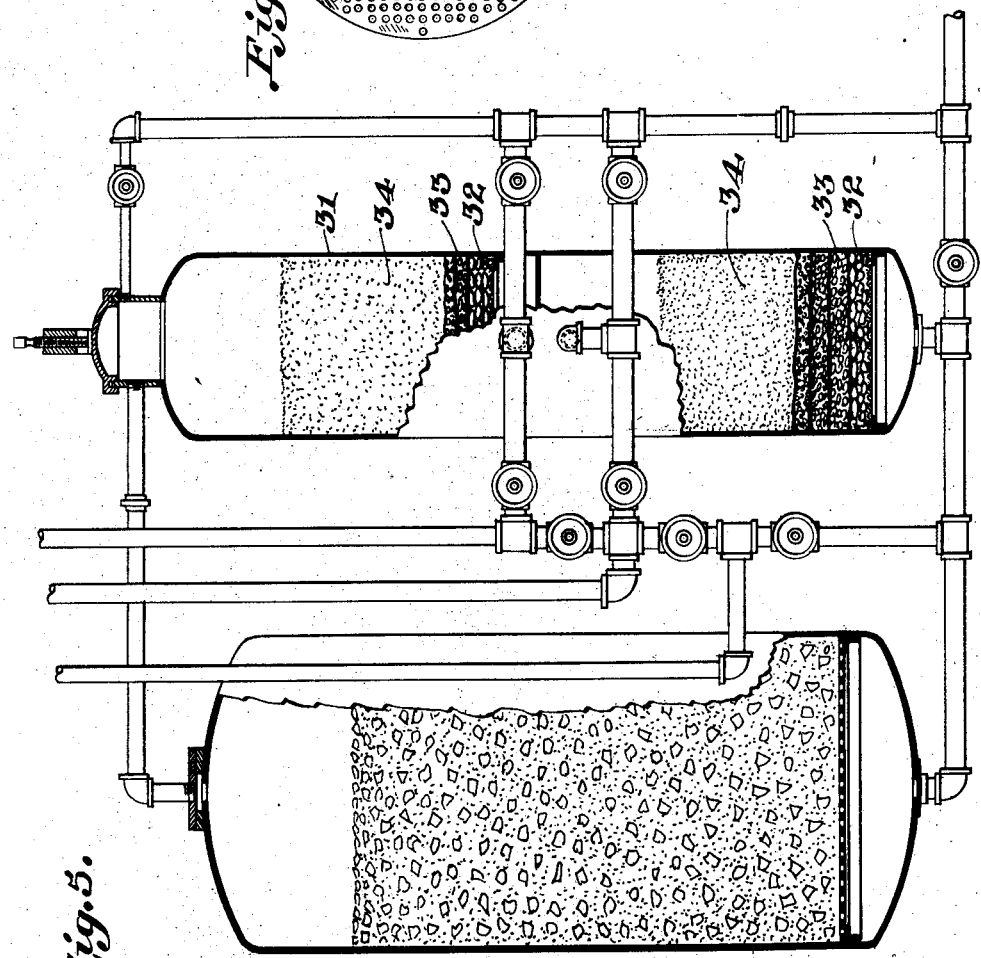

Patented Feb. 26, 1929.

1,703,451

UNITED STATES PATENT OFFICE.

CHESTER T. McGILL, OF ELGIN, ILLINOIS, ASSIGNOR TO ELGIN SOFTENER CORPORATION, OF ELGIN, ILLINOIS, A CORPORATION OF ILLINOIS.

BASE-EXCHANGE WATER SOFTENER AND FILTER.

Application filed April 3, 1926. Serial No. 99,610.

This invention relates to improved means and methods for filtering the raw water supply before passing into a base exchange softener, thereby furnishing clear, clean water freed from the suspended matter.

After the water has been softened it passes into a filter removed from the softener and softened water is filtered by suitable means before passing into the surface lines. The object of this procedure is to maintain the soft water free from any impurities that may get to the water softener through reclaiming or regenerating the mineral with a sodium chloride solution or otherwise.

In this invention, the filter means is arranged in combination with the water softener in such a manner as to be located at a suitable distance therefrom providing the filtering of the raw water and the filtering of the softened water in combination with a salt pot.

An object of this invention is to provide a means in combination with the base exchange water softener whereby the raw water may be filtered in the bottom portion of the salt pot attachment and carried down from the salt pot to the bottom of the base exchange water space softener.

In this invention, furthermore, means are provided so that the filtering material may be back-washed without disturbing the operation of the softener at intervals which is found necessary in order to eliminate the accumulation or the breeding of bacteria.

A further object of this invention is to provide a suitable filter within the salt pot arranged to accommodate the salt which is required to regenerate the mineral, and after the base exchange mineral is regenerated and the softener put in service, it is also to retain any of the fine mineral which otherwise might be carried out into the soft water into the service lines.

In this invention, any fine exchange mineral is filtered in the top portion of the filter and salt pot, thereby furnishing soft water without any zeolite mineral contained therein and therefore without wasting any of this mineral.

A prime object of this invention, is therefore to provide means for back-washing the filtering material without interfering with the softening process or of necessitating the regenerating at the time the filtering material is back-washed, and to further provide a means for back-washing the filtering material which separates the suspended material from the raw water, and the fact that this filtering material is back-washed once a week, eliminates the danger of any bacteria accumulating and carried to the softening material and hence up into the soft water lines.

Further objects of this invention will appear from the following detailed description of this device and as disclosed in the two sheets of drawings which are herewith made a part of this application.

In the drawings,

Fig. 1 illustrates a sectional view of the combined water softener and filter including a softener tank, salt pot, and filtering arrangements with the necessary pipe line and valve control.

Fig. 2, represents a plan view of a form of filtering material.

Fig. 3 is a plan view of a perforated plate adapted to support the zeolite mineral material and to distribute the water passed through the mineral material.

Fig. 4 is a plan view of a solid plate adapted to be located in the salt pot.

Fig. 5 represents a vertical sectional view of a modified form of a base exchange water softener and filter arrangement.

Fig. 6 is a plan view of a filter material adapted for use in a modified form of this invention disclosed in Fig. 5.

Fig. 7 is a plan view of a perforated plate adapted for use in the modified form of base exchange water softener and filter disclosed in Fig. 5.

Fig. 8 represents a plan view of a solid plate welded as desired, in the salt pot shown in the modified form of base exchange water softener and filter.

Numeral 1 indicates a water softening tank adapted to contain a suitable base exchange material 2, consisting of any material which may be properly adapted for base exchange purposes, a lower portion of the tank 1 is adapted to be suitably provided with a space 3 for receiving primarily the water required for softening purposes which is adapted to enter the tank 1 through the pipe line 4.

Above the receiving space 3, in the lower portion of the tank 1 is located a perforated plate 5, which plate or plates, are adapted to support the zeolite mineral 2, and also to properly distribute the water up through the mineral. The perforations in the plate 5 may be of any suitable number for accomplishing the purpose.

The zeolite material 2 extends above the plate 5 within the tank 1 to a distance sufficient for allowing a free board 6 space, above the normal top bed of mineral and the soft water outlet.

Properly leading from the free board space 6, of the tank 1, is a pipe line 7 adapted to connect with a fill nozzle 8 having a cap portion 9 located and connected with a salt pot device 15, which is adapted to receive the salt for regenerating and when in operation, also receives any fine mineral which otherwise would be carried away with the softened water.

Within the salt pot 15 is suitably located a filtering material 11, and a solid plate 12, adapted to be permanently welded or otherwise suitably attached in the salt pot 15 between the top filtering material 11 and the bottom material 13, which material is located at the bottom of the salt pot for the prime purpose of allowing the raw water to pass therethrough. Between filtering material 13 and the solid plate 12 of the salt pot portion 10 is adapted to be located a water space 14.

In combination with the tank 1 and the salt pot attachment 15, and in operation thereof, valves 16, 17 and 18 are open, then valves 19, 20, 21, 22, 23, and 24, are closed. This arrangement and position of valves will allow the water to pass from the raw water supply line 25 through the valve 17 into the water space 14 within the salt pot 15, down through the filter screen or other suitable material 13 in to the line 26, which leads from the bottom of the salt pot filter arrangement 15, and hence to the line 27 and 4. That portion of the water which is desired to be filtered but not softened passes up through line 27, valve 18 and into the filtered water line 28. That portion of the water required for softening passes through the line 4 into the space 3 through the perforated plate 5 up through the top connecting element 7 to the salt pot 15, down through a space 10 which space 10 retains the fine mineral carried from the water softener with the soft water, the water then passes through the filtering screen or material 11 through the valve 16 into the soft water line 29.

In the back-washing of the filtering material which filters the raw water, the following procedure in the use of this device is set forth:

To relieve the filter of suspended and vegetable matter, valve 22 is opened and valve 17 closed, then valve 24 is open which allows a flow of raw water down through valve 18 in line 27 up through line 26, through the filtering material or screen 13, back-washing the liquid through valve 24 to the drain 30.

After the reversed current has cleansed the filtering material or the screen 13 in the salt pot 15, valves 24 and 22 are closed and valves 17 opened and the filtering portion is again in operation, filtering the water before it enters the base exchange softener 1.

It will be apparent that during the period of back-washing the filtering screen or material 13, which should be done in the average household or otherwise about once a week, the softener 1 and the filter water line 28, is supplied with unfiltered raw water.

In the regeneration and operation as provided in this invention, the following procedure is set forth:

When the base exchange mineral becomes exhausted and needs reclaiming by sodium chloride or other regenerating chemicals, open valves 19, and 22, close valves 16, 17 and 18, and open valves 21 and 23. Remove cap 9 from the fill nozzle 8. As soon as enough water has been drained out of the salt pot filter arrangement 15 from the space 10, close valves 21 and 23. Then insert salt through the fill nozzle 8. Replace cap 9. Open valve 20 about one-half turn. Open valve 16 which will admit raw water through the filtering material or filtering screen 11, dissolving the salt and carrying the solution through the top portion of the fill nozzle 8 through the connecting element 7 into the top portion of the softener 1. This will allow the carrying of the brine solution from salt pot to softener at the rate of one to two gallons of water per minute thereby regenerating and reclaiming the zeolite mineral to its full capacity and carrying the hardness to the drain 30. It will require from 20 to 30 minutes for this operation after which valves 20 and 16 are closed. Valves 17, 23 and 18 are opened and valve 22 closed, thereby permitting the raw water to enter through the valve 17 down through the filtering material 13, connecting elements 26 and 4, up through the filtering material 2 and from the softening tank 1 to the salt pot filter arrangement 15 out through valve 23 to the drain 30.

As soon as the water becomes soft at the drain 30, the softener is ready to be put into operation. Close valve 23, open valve 16, close valve 19 and the softener is again in service. The connection to the top portion of the fill nozzle 8 leading to valve 21 is for the purpose of draining off any scum or sediment which is carried to the softener in brining with salt. The filter material 11 of this invention may be substituted by the use of gravel, quartz, and sand by merely lengthening the salt pot filter arrangement as disclosed in 31 of Figure 5. The gravel, quartz and sand in this modified form are designated by numerals 32, 33, and 34. The substitution of sand, quartz, and gravel as filtering material under this construction would operate identically the same as operating instructions pertaining to filtering material of finely woven wire screen or porous alundum plate or any other fused material commonly used in filtration.

One of the prime features of this invention is the provision for eliminating the usual necessity of regenerating softeners from one to three weeks. The main object of eliminating suspended matter which is apt to breed bacteria in a water softener is thereby effected. With this invention and elimination of the bacteria once a week, the softener tank may be considerably increased in size, thereby accommodating a large amount of base exchange material and hence increasing the softening capacity to such an extent that a softener does not have to be regenerated oftener than once every sixty or ninety days and in many cases longer.

Furthermore, in operation, this invention provides a means for keeping the mineral clean and free from packing effects, inasmuch as there would be no back pressure appreciably of the mineral, thereby greatly prolonging the life, and utility of the base exchange mineral.

In addition, a prime advantage of this invention is, that backwashing may be accomplished both downward and upward at the same time, for it is apparent that after the salt has been added, the flow of liquid or brine solution has been downward from 20 to 30 minutes, valves Nos. 16, 17 and 20 are closed.; valves 22 and 24 are open wide; valves 21 open partially; this allows water under pressure to enter from line 27 to lines 4 and 26, thereby flushing the filtering material 13, carrying the suspended and bacteria matter through valve 24 to drain 30, at the same time carrying a portion of the water through base exchange mineral 2, thereby removing any remaining solids or suspended matter through connecting element 7 to salt pot fill nozzle 8, thence to line leading to valve 21 and to drain 30. This removes in addition to the brine solution, any scum or sediment that is carried to the softener with the salt.

What I claim is:

1. The combination with a base exchange water softening tank, a salt pot connected thereto, means for filtering raw water in the salt pot before passing into the tank and means for filtering softened water passing from the tank in the salt pot.

2. The combination with a base exchange water softener and tank, of a salt pot device in open communication therewith, of means within the salt pot for filtering the raw water before it flows into the base exchange tank, and of means within the salt pot for filtering the soft water as it comes from the tank, the last named filter means being adapted to support the salt which is required to regenerate the base exchange.

3. The combination with a base exchange water softener and tank, of a salt pot device in open communication therewith, of means within the salt pot for filtering the raw water before it flows into the base exchange tank, and of means within the salt pot for filtering the soft water as it comes from the tank, and means for flushing the suspended filtered matter to the drain between regenerating periods.

4. The combination with a base exchange water softener and tank, of a salt pot device in open communication therewith, of means within the salt pot for filtering the raw water before it flows into the base exchange tank, and of means within the salt pot for filtering the soft water as it comes from the tank, the arrangement of parts being such that the fines of the exchange material are carried back from the salt pot with the brine solution during regenerating periods.

5. The combination in a base exchange water softener, of a tank, of a salt pot device in open communication therewith, of means within the salt pot for filtering the raw water before it flows through the base exchange material, and of means within the salt pot for filtering the soft water as it comes from the tank, of means for backwashing a portion of the filter materials and the base exchange mineral simultaneously.

6. The combination in a base exchange water softener, of a tank, of a salt pot device in open communication therewith, of means for filtering raw water, of means for supplying filtered unsoftened water, of means within the salt pot for filtering the soft water as it comes from the tank, of means for backwashing the filtering materials and the base exchange mineral simultaneously, consisting of water chambers within the salt pot for back-washing the filter screens, and water chambers within the tank for receiving the water for backwashing the mineral simultaneously with the backwashing of the filter material in the salt pot.

7. In combination with a base exchange water softening tank, a salt pot connected thereto, means for filtering raw water in the salt pot before passing into the tank and means for filtering softened water passing from the tank into the salt pot, means for supplying filtered softened water and filtered unsoftened water at the same time.

8. In combination with a base exchange water softening tank, a salt pot connected thereto, means for filtering raw water in the salt pot before passing into the tank and means for filtering softened water passing from the tank into the salt pot, means for backwashing the filter between regenerating periods without passing the wash water through the base exchange material.

9. In combination with a base exchange water softening tank, a salt pot connected thereto, means for filtering raw water in the salt pot before passing into the tank and means for filtering softened water passing from the tank into the salt pot, means for backwashing the filter and supplying softened water simultaneously.

10. In combination with a base exchange water softener, a tank, a salt pot device in open communication therewith, means within the salt pot for filtering raw water, softened water and fine mineral from the soft water as it leaves the softener before entering the service line, means for backwashing the raw water filter while the softener is in operation, means for backwashing the soft water filter at regenerating periods, means for passing the brine solution through the zeolite mineral without passing the brine solution through the filter material, means for distributing the water to the zeolite mineral, means for eliminating packing and matting of the zeolite mineral.

In testimony whereof I affix my signature.

CHESTER T. McGILL.